United States Patent [19]

Woodring

[11] 4,057,127
[45] Nov. 8, 1977

[54] SAFETY ACTUATING DEVICE ADAPTED FOR TWO WHEELED VEHICLES

[75] Inventor: Cooper Coolidge Woodring, Plandome, N.Y.

[73] Assignee: J. C. Penney Company, Inc., New York, N.Y.

[21] Appl. No.: 629,573

[22] Filed: Nov. 6, 1975

[51] Int. Cl.² .............................................. B62L 3/08
[52] U.S. Cl. ..................................... 188/24; 188/2 D
[58] Field of Search ......................... 188/2 D, 24–26, 188/204 R; 74/489, 501 R

[56] References Cited

U.S. PATENT DOCUMENTS

| 3,782,507 | 1/1974 | Shreve | 188/2 D |
| 3,942,609 | 3/1976 | Hill | 188/24 |

FOREIGN PATENT DOCUMENTS

| 852,616 | 10/1939 | France | 188/2 D |
| 268,439 | 1927 | United Kingdom | 188/2 D |

*Primary Examiner*—Duane A. Reger
*Attorney, Agent, or Firm*—Pennie & Edmonds

[57] ABSTRACT

A device for controlling the application of braking action to a vehicle having at least two wheels, one wheel being a forward wheel, the other wheel being a rearward wheel, each wheel having associated therewith, means for braking and unbraking the rotation thereof in response to displacement inputs directed thereto and forward and rearward associated operator control means. The device comprises movable control means positioned intermediate the forward and rearward braking means and the associated operator control means, means operatively communicating the movable control means with the rearward braking means, means operatively communicating the rearward operator control means with the movable control means and with the associated rearward braking means, means operatively communicating the movable control means with the forward braking means, and means operatively communicating the forward operator control means with the movable control means. The operative communication between the forward and rearward operator control means to the movable control means and the operative communication between the movable control means to the respective forward and rearward vehicle wheels being such that actuation of the associated rearward operator control means produces at least a corresponding displacement and braking action of the rearward wheel. Actuation of the associated forward operator control means produces at least an initial displacement of the rearward brake means which at least initially exceeds the displacement and braking action applied to the forward wheel to thereby assure at least initial rearward braking action on the vehicle when operational control movements are applied to either the rearward of forward operator controls.

19 Claims, 23 Drawing Figures

TO FRONT BRAKE    TO REAR BRAKE

TO FRONT BRAKE  TO REAR BRAKE

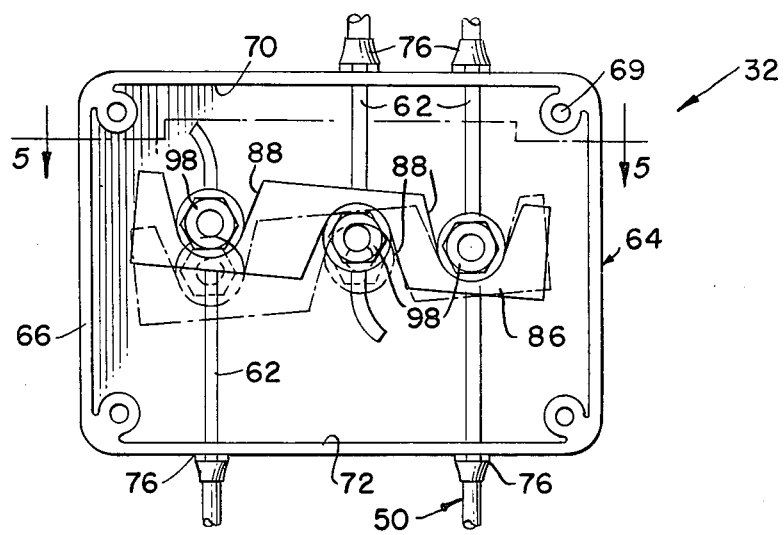
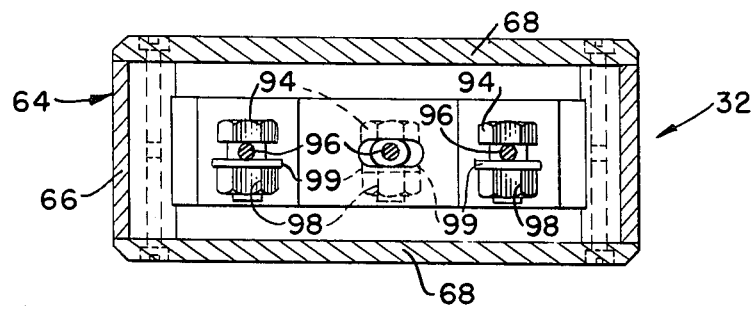
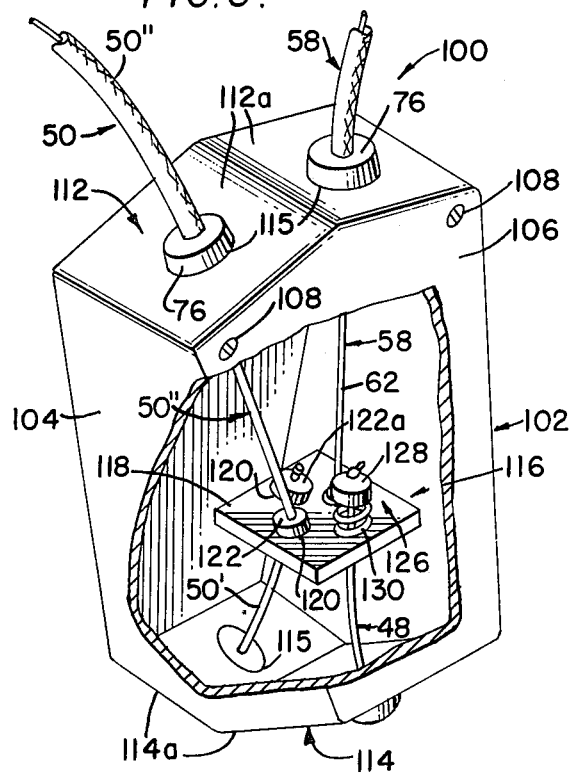
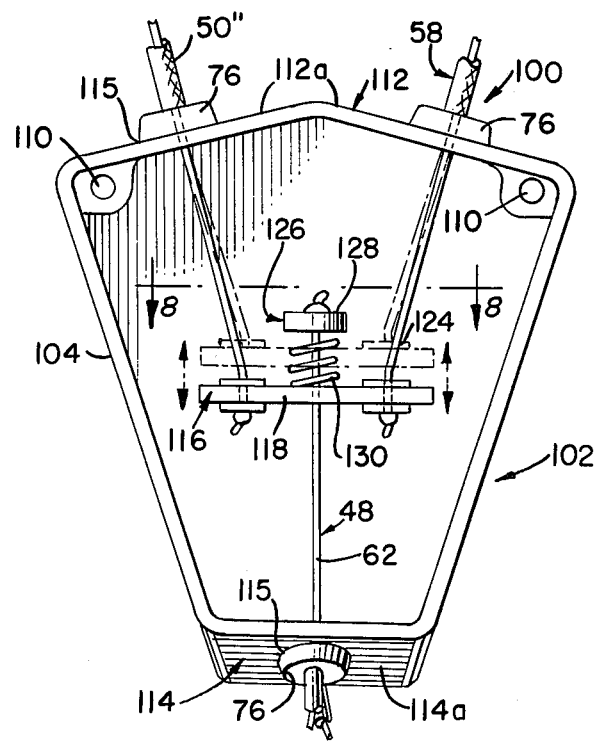

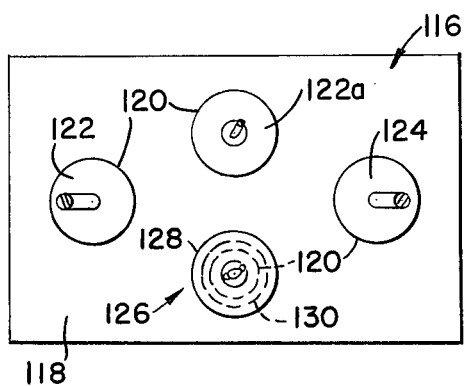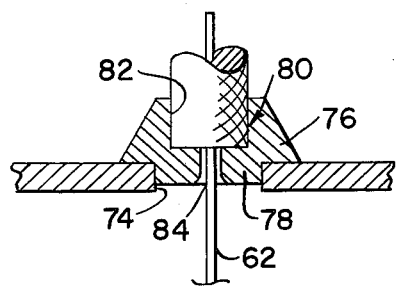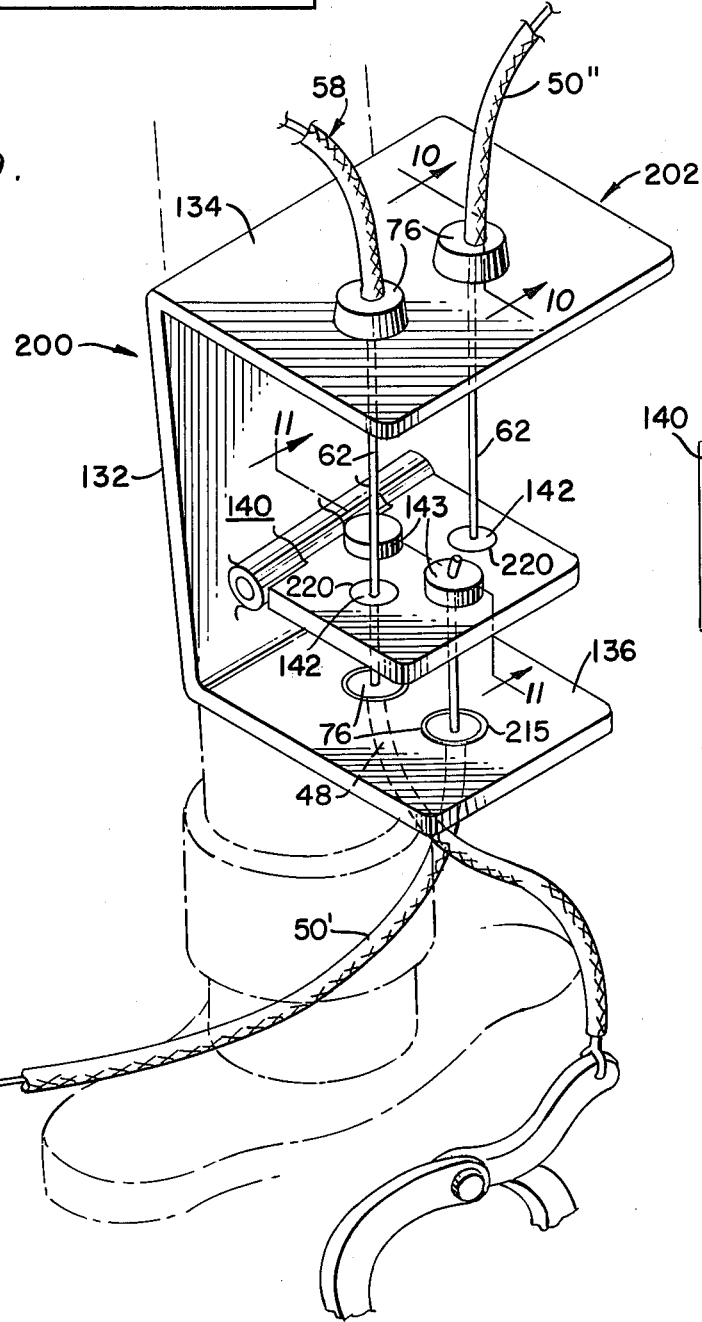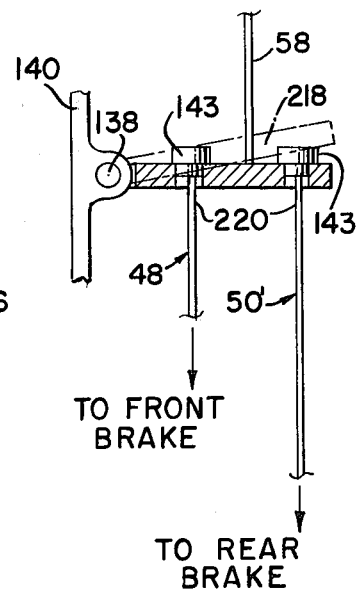

TO REAR BRAKE    TO FRONT BRAKE

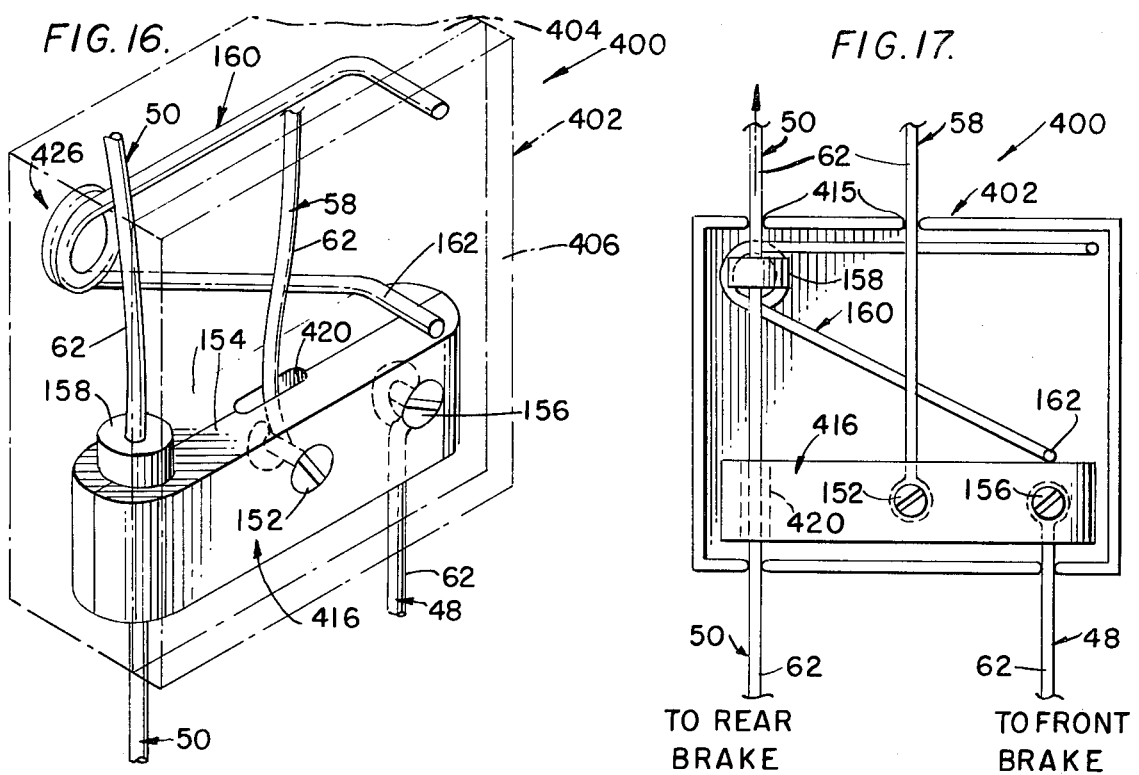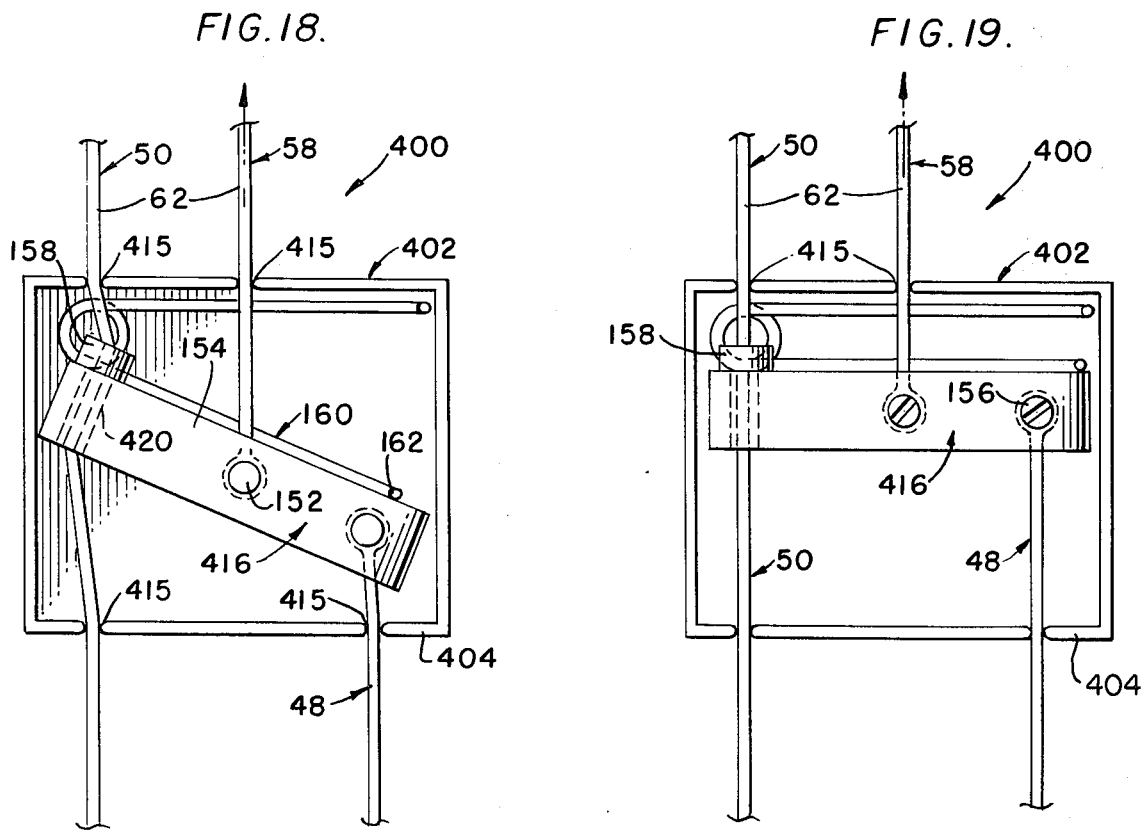

TO REAR BRAKE    TO FRONT BRAKE

SAFETY ACTUATING DEVICE ADAPTED FOR TWO WHEELED VEHICLES

BACKGROUND OF THE INVENTION

This invention is directed to an actuating mechanism. More particularly, it is directed to a novel and improved safety brake actuating mechanism for at least two-wheeled vehicles or the like.

DESCRIPTION OF THE PRIOR ART

In general, conventional two-wheeled vehicles, such as bicycles and the like, are normally equipped with brake devices which are independently associated with each one of the front and rear wheels thereof. As is also customary, each of such brake devices are separately and operatively connected, in conventional fashion, to be actuated, respectively, by right and left hand brake levers. Typically, an operator in order to apply braking pressure to each one of the front and rear wheels must of necessity operate both brake levers. It may occur in certain circumstances, however, that a bicycle rider will be unable to simultaneously actuate both the right and left hand brake levers so as to only apply the necessary braking force and also to actuate both the front and rear wheel brakes. A typical example is a bicycle rider who in carrying an object in one hand and has one free hand remaining to actuate the braking device.

Accordingly, with only one brake device being able to be appropriately actuated, a dangerous situation presents itself. Furthermore, if whenever only the front brake is suitably applied and/or is applied with greater braking pressure than the rear brake, there is a tendency for rider and bicycle momentum to force the rider generally forwardly and perhaps even over the handlebars. Hence, an obvious unsafe situation occurs and, therefore, such a braking system is not entirely satisfactory.

One attempt to overcome the shortcomings of this type is generally described in U.S. Pat. No. 3,782,507. As disclosed in the above-referenced patent, the brake actuating mechanism is related to a brake actuating system for two-wheeled vehicles so as to initially brake the rear wheel prior to the front wheel. This system, however, is rather complicated and expensive. Furthermore, it relies upon a relatively large number of rigid members to accomplish the noted sequential brake actuation. Moreover, in the described system, attainment of the sequential actuation is limited to a particular situation wherein actuation by only one of two brake actuating members is permitted, that is, either brake actuating member cannot be appropriately operated to perform the sequential brake operation so as to enable the rear brake to be applied prior to the application of the front brake. In addition, the rear brake will not always be applied regardless of which of the brake actuating members is actuated. My invention contemplates a novel and improved safety brake actuating device which overcomes the aforementioned shortcomings associated with prior art brake systems and is particularly adapted for utilization on two-wheeled vehicles or the like.

SUMMARY OF THE INVENTION

Briefly stated, the novel and improved actuating device of the present invention is particularly adapted for use on two-wheeled vehicles wherein one wheel is a forward wheel, the other wheel being a rearward wheel, and each wheel having associated therewith means for braking and unbraking the rotation thereof in response to displacement inputs directed thereto and forward and rearward associated operator control means. Such device serves to apply the brakes in such fashion that, regardless of which operator control means is actuated, the rear braking means is at least initially applied. Essentially, this particular device comprises movable control means positioned intermediate the forward and rearward braking means and the associated operator control means. The device further comprises means operatively communicating the movable control means with the rearward braking means and means which operatively communicate the rearward operator control means with the movable control means and with the associated rearward braking means. The present device also contemplates means operatively communicating the movable control means with the forward braking means. Such device of this invention further includes means operatively communicating the forward operator control means with the movable control means. The operative communication between the forward and rearward operator control means to the movable control means and the operative communication between the movable control means to the respective forward and rearward vehicles wheels being such that actuation of the associated rearward operator control means produces at least a corresponding displacement and braking action of the rearward wheel. Actuation of the associated forward operator control means produces at least an initial displacement of the rearward braking means which at least initally exceeds the displacement and braking action applied to the forward wheel to thereby assure at least initial rearward braking action on the vehicle when operational control movements are applied to either the rearward or forward operator controls.

The present invention also envisions that the device thereof can be utilized on other environments, such as, for transmitting displacement output signals to at least a first and second displacement output means in accordance with a predetermined sequence and in response to actuation of first and second operator control means operatively associated with the first and second output means. Such device comprises movable control means defining at least one opening therethrough, and being displaceable in response to actuation of at least the first operator control means. Also, this device further includes a first and second coupling means operatively connected to the movable control means. The first coupling means further being operatively connected to the first output means and communicates with the opening in the movable control means, such that displacement of at least the first operator control means provides a corresponding displacement of the first output means. Such second coupling means connecting the second operator control means to the movable control means and operatively connecting the first output means to the movable control means in a manner such that whenever there is displacement of at least the second operator control means, there is displacement of the first output means by a distance which at least initially exceeds the distance for the second output means.

In a preferred embodiment, the device is constructed such that the movable control means is an elongated member having a flexible control cable connected from one end thereof to the rearward brake means, and a flexible control cable connected to a general medial portion thereof and to the forward operator control means. A control cable is connected from the rearward operator control means and extends through an opposite end portion of the control means to the rearward brake means. Such rearward brake control cable is responsive to displacements through the rearward operator control independent of the control means. The control cable which connects the forward operator control to the control means is spaced from the forward brake cable by a distance greater than one-half the space to the rearward brake cable, such that actuation of the forward operator control provides displacements and corresponding braking action to the rearward brake means which at least initially exceeds the braking action applied to the forward wheel.

In another embodiment, the actuating device is arranged such that the forward braking means is displaced by less of a distance than the rearward braking means is displaced, in response to actuation of either or both of the forward and rearward operator control means. In other embodiments, the displacement of the forward braking means with respect to the displacement of the rearward braking means is delayed in addition to being applied to a lesser extent than the rearward braking means. In particular, the front brake is applied after the rear brake and with, of course, less braking pressure.

BRIEF DESCRIPTION OF THE DRAWINGS

These and other objects, features and advantages of the present invention will become apparent upon a reading of a detailed description of the preferred embodiments made in accordance with the principles thereof when viewed in conjunction with the accompanying drawings wherein like reference numerals indicate like structure throughout the several views.

FIG. 4 is a side elevational view similar to FIGS. 2 and 3 but, however, illustrating the preferred actuating device in yet other operative positions;

FIG. 5 is a view taken substantially along the section line 5—5 appearing in FIG. 4 looking in the direction of the arrows and illustrating further details of the preferred actuating device embodying the principles of this invention;

FIG. 6 is an enlarged perspective view of an alternate embodiment of the actuating mechanism partially broken away to better illustrate additional details of such device;

FIG. 7 is a side elevational view of the housing shown in FIG. 6, but with a cover thereof removed so as to illustrate another view of the actuating device;

FIG. 8 is a plan view taken substantially along line 8—8 in FIG. 7 looking in the direction of the arrows and better illustrating certain details forming the actuating device of the present invention;

FIG. 9 is a perspective view illustrating another alternate embodiment of an actuating device made in accordance with the principles of the present invention;

FIG. 10 is a sectional view taken substantially along section line 10—10 in FIG. 9 looking in the direction of the arrows and illustrating a detail of the present invention;

FIG. 11 is a sectional view taken substantially along section line 11—11 in FIG. 9 looking in the direction of the arrows and illustrating another view of such alternate embodiment of the present invention;

FIG. 16 is a perspective view of still another embodiment of an actuating device of the present invention;

FIG. 17 is a side elevational view of the actuating device depicted in FIG. 16 with a portion of the housing removed to more clearly illustrate the actuation of a rear brake actuating cable independent of a front brake actuating cable;

FIGS. 18 and 19 are side elevational views similar to FIG. 17 illustrating the positional sequences of the components forming the actuating device in response to displacement of a front handlebar actuating cable;

DETAILED DESCRIPTION

Figure 1:
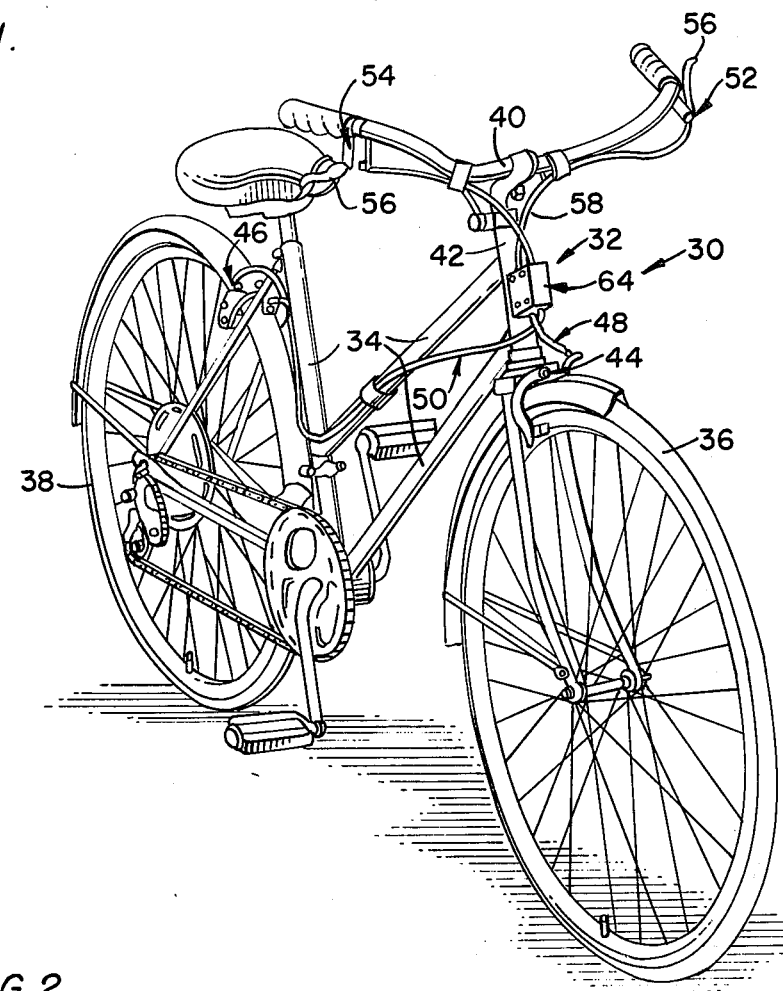
FIG. 1 is a perspective view of a bicycle having connected thereto an actuating device embodying the principles of the present invention.

Referring now to the details of the drawings, there is disclosed a conventional two-wheeled vehicle, such as a bicycle or the like 30. Operatively mechanically connected therewith is a novel and improved safety brake actuating device embodying the principles of the present invention and generally designated by the reference numeral 32. It should be understood, of course, that the safety brake actuating device 32 may be successfully employed in other two-wheeled type vehicles, such as motorcycles or the like.

With reference to FIG. 1 taken in conjunction with FIG. 9, the bicycle 30 is shown generally as comprising a suitable frame structure 34 having secured thereto, forward and rearward wheels 36 and 38, respectively, the former being steerable by means of a conventional handlebar 40 which is rotatable within a housing stem 42 formed on frame structure 34. Suitably and conventionally connected with respective ones of the forward and rearward wheels 36 and 38 are forward and rearward braking means or devices 44 and 46, respectively. Braking devices 44 and 46 may be of any conventional type, as for example, the caliper type. Other types of braking devices may, of course, be used, such as of the disc brake type. In any event, however, the braking devices 44 and 46 should be of the type which are actuated by controlled displacement of braking actuating cables connected thereto. Since the braking devices 44 and 46 are constructed of commercially available components and function in a standard manner, a detailed description thereof will be dispensed with. To more fully appreciate the present invention, however, it should be borne in mind that these braking devices 44 and 46 apply a braking pressure to their respective wheels which is a direct function of the displacement of a pair of flexible front and rear brake actuating output cables 48 and 50, respectively. Output cables 48 and 50 are appropriately attached at one end in well-known fashion to the respective forward and rearward associated braking devices 44 and 46. The opposite ends of the brake actuating cables 48 and 50 are connected in a manner to be presently described.

Both the forward and rearward braking devices 44 and 46 are adapted to be selectively controlled by respective conventional types of forward and rearward handlebar lever assemblies 52 and 54, respectively. Each handlebar lever assembly 52 and 54 includes a pivotally mounted handlebar lever 56 which is adapted to be selectively gripped by an operator. Each of the forward and rearward handlebar levers 56 is appropriately fastened to an actuating cable. In the present embodiment, rearward brake actuating cable 50 is attached to the rearward handlebar lever 56. The particular significance of this arrangement will be hereinafter set forth. A forward handlebar actuating cable 58 interconnects the forward lever 56 to actuating device 32 in a manner to be described. In the preferred embodiment of the present invention, each of the cables 48, 50, and 58 may be comprised by any suitable and conventional kind of Bowden type cable or the like. As perhaps best viewed in FIGS. 2 and 3, such cables are comprised of a relatively flexible sheath 60 which has centrally slidably disposed therein a flexible wire core 62 which is displaceable in direct response to the handlebar levers 56 being gripped and squeezed to effect operational control movements.

As shown in FIGS. 2 to 5, the actuating device 32 is more particularly illustrated. In this preferred embodiment, the actuating device 32 may include a support housing 64 which is mountable as a unit on any convenient portion of the bicycle 30, such as the housing stem 42, in a suitable manner. Although the embodiment to be described discloses use of a housing 64, such need not be employed. The housing 64, however, is generally defined by a casing 66 which may have removably secured at opposite ends thereof generally flat cover plates 68. Housing 64 is fabricated from any type of suitable material, especially one which is adapted to withstand outdoor usage as well as occasional impacted loads without fracturing. Such cover plates 68 may be fastened to the casing 66 by conventional screws which threadedly cooperate with respective threaded openings 69 formed in casing 66. Casing 66 includes at least a top surface 70 and a bottom surface 72, each having a pair of openings 74 one of which is clearly shown in FIG. 10 which facilitate slidable entry of the wire cores 62 and a suitable type of fitting member or connection means 76 which fastens the sheaths 60 to the casing 66.

Specifically referring to FIG. 10, the fitting members 76 are defined by a generally truncated, preferably resilient grommet. As noted, the grommet 76 has a centrally reduced portion 78 which is designed to be snugly yet removably fitted within one of the respective openings 74 formed in the housing 64. Each grommet 76 has a passageway 80 centrally formed therethrough which is defined by a pair of coaxial first and second bores 82 and 84, respectively. Bore 82 is appropriately dimensioned to receive a sheath 60, while bore 84 permits a wire core 62 to freely pass therethrough. By such arrangement, the sheath 60 which normally has a tendency to longitudinally extend, is contained and inhibited from so extending. Accordingly, possible inadvertent displacement of other components of the actuating device 32 is prevented. In addition, the grommets 76 serve to protect the interior of housing 64 against undesired introduction of dust and other debris.

With continued reference to FIGS. 2 to 5, the actuating device 32 basically includes a generally vertically movable braking control member 86 which serves to enable the operative interconnection of the forward and rearward handlebar lever assemblies 52 and 54 respectively to forward and rearward braking devices 44 and 46, respectively. Movable control member 86 in the embodiment illustrated in FIGS. 2 to 5 has three laterally spaced transverse cutouts 88, two being generally upwardly directed and located at opposite ends of the movable control member and a central cutout formed in the underneath surface and being generally downwardly directed.

Generally, centrally associated with each of the cutouts 88 is a generally truncated or tapered wall 90 which defines opening 91 which outwardly flares from fastening means 92 to the opposite surface of the control member. Each tapered opening 91 permits lateral movement of the wire cores 62 for reasons hereinafter made evident. In this particular embodiment, three pairs of cooperating fastening means 92 are detachably connected to respective wire cores 62 and are cradled in respective ones of the cutouts 88. Fastening means 92 includes threaded bolt 94 having a transverse opening 96 therethrough which accommodates the wire core 62 and threaded nut 98 with corresponding washer 99. Nuts 98 are threaded onto respective bolts 94 to securely sandwich the core wires 62 between a head of the bolt 94 and the nut 98 and washer 99. Accordingly, fastening means 92 conjointly moves in unison to displacement of the cables 48, 50 and 58. The bolt 94 and nut 98 arrangement permits lateral swinging movement of the core wires 62 within the area defined by the walls 90 of the tapered openings 91. Of course other similar types of detachable connections are contemplated within the spirit and scope of this invention.

The cutouts 88 of the control member 86 are spaced relative to each other such that the wire core 62 of the middle or front handlebar cable is offset spaced from the core wires 62 of front and rear brake actuating cables 48 and 50, respectively. In the preferred embodiment, the middle cable 58 is spaced between the two end cables 48 and 50 by approximately 58% of the distance from the front brake actuating cable 50. It is contemplated by the present invention that cable 58 be spaced from the front brake actuating cable 48 at any distance greater than about one-half the distance between the front and rear brake actuating cables 48 and 50, respectively, without departing from the spirit and scope of this invention.

Figure 2:
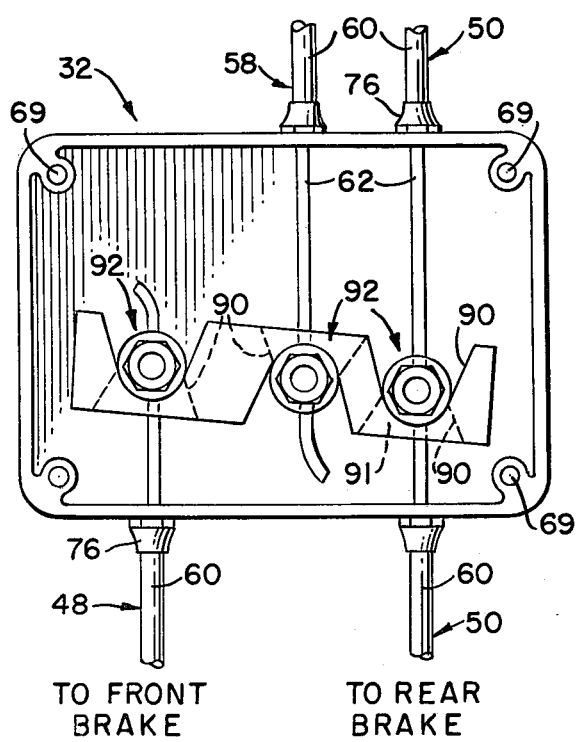
FIG. 2 is a side elevational view of a preferred embodiment of the actuating device with portions removed for sake of clarity to better illustrate such actuating device in a neutral or inoperative position.

By reason of the foregoing constructional arrangement moveable control member 86 is generally slanted upwardly whenever in the rest or inoperative position, such as more clearly depicted in FIG. 2. As observed, the nut 98 and bolt 94 attachment which is connected to the rear brake actuating cable 50 has its center of rotation located below the axes of rotation of both the bolt 94 and nut 98 arrangements associated with the front brake actuating cable 48 and front handlebar actuating cable 58. The significance of the offset and the tilted arrangements will be presently mentioned.

Figure 3:
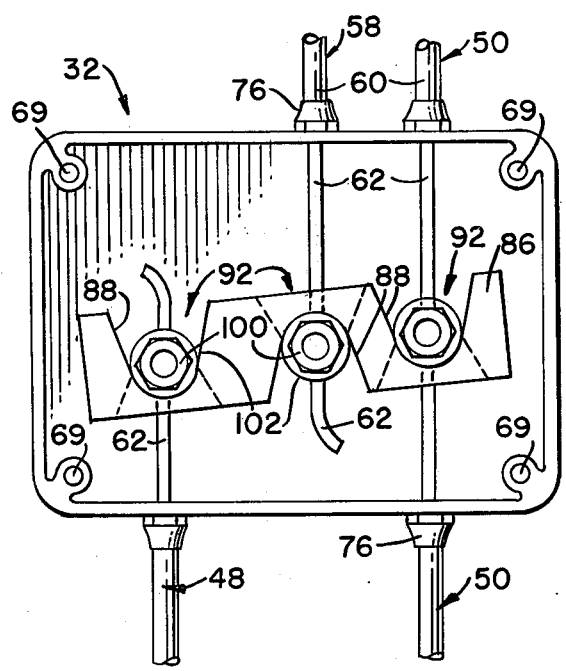
FIG. 3 is a side elevational view similar to FIG. 2 but, however, illustrating the actuating device in an intermediate operative condition.

Accordingly, having heretofore described the constructional arrangement of this particular embodiment, reference is made to FIGS. 2 to 4 to perhaps more clearly illustrate the sequence of operations involved whenever either of the levers 56, respectively, associated with the forward and rearward handlebar lever assemblies 52 and 54 are actuated. Whenever the lever 56 which is associated with the rearward actuating device 46, is operated, the rear brake actuating cable 50 is correspondingly displaced. In response to such displacement of the cable 50, the bolt 94 and nut 98 arrangement with such cable will also be displaced, and, in this embodiment, will move independently upwardly from the movable control member 86. As a consequence thereof, the rearward braking device 46 is actuated to apply the appropriate braking pressure to the rearward wheel 38 independently of the forward wheel 36.

On the other hand, whenever the handlebar lever 56 for the forward brake actuating device 44 is operated in standard fashion for braking purposes, forward handlebar actuating cable 58, of course, is vertically moved. Since the bolt 94 and nut 98 are conjointly movable with such cable 58 and are engaged with the middle cutout 88, the movable control member 86 is generally upwardly moved. Such movement, however, results in movable control member 86 tilting in a fashion which serves to initially actuate the rearward braking device 46 prior to the forward braking device 44. The tilting action results from the previously described offset spacing of the middle or forward handlebar actuating cable 58 with respect to the front and rear brake actuating cables 48 and 50. As more clearly noted in FIG. 3, the right most portion of movable control member 86 rises such that the axis of rotation of the bolt 94 and nut 98 of cable 50 moves from below (FIG. 2) to above the axes (FIG. 3) for the bolt 94 and nut 98 arrangements associated with forward handlebar cable 58 and front brake actuating cable 48. Accordingly, rear brake actuating cable 50 is initially displaced, while the front brake actuating cable 48 is not displaced. Such tilting of movable control member 86 is facilitated by the cutouts 88, which enable such member to rotate relative to the bolt 94 and nut 98 arrangements associated with cables 48 and 58. Moreover, tapered openings 91 also facilitate the foregoing tilting by not interfering or pinching the core wires 62 associated with the actuating cables operatively connected to control member 86. It should be pointed out that the tapered openings 91 can be appropriately dimensioned to avoid pinching or other interference with such core wires.

Continued upward movement of forward handlebar actuating cable 58 will also result in the movable control member 86 being appropriatley raised. By virtue of the cooperation of bolt 94 and nut 98 arrangement associated with cable 48 with its corresponding cutout 88, is such that cable 48 will also be upwardly displaced. In response to such displacement, of course, forward braking device 44 is actuated to gradually apply a braking force to the forward wheel 36. Such displacement of forward handlebar cable 58 likewise displaces cable 50 to its upper limit of movement, as indicated in FIG. 4, which may be defined by the cable 50 fully applying the rearward brake actuating device 46. It will be noted, however, that whenever cable 50 has fully applied the rearward braking device, cable 48 will not be fully upwardly displaced; such as depicted by the phantom lines in FIG. 4. However, continued displacement of handlebar cable 58 will eventually result in the movable control member assuming the solid line position indicated in FIG. 4, whereby the bolt 94 and nut 98 arrangement for cable 48 is elevated with respect to that bolt and nut arrangement of cable 50. This upward tilting action of the leftward portion of movable control member 86 relative to the opposite portion thereof is facilitated by fact that cutouts 88 enable relative rotation of such member and tapered openings 91 avoid pinching of the respective cables during such tilting movement. As should be understood throughout the specification, whenever mention is made that cables 48, 50 and 58 are displaced, such displacement, of course, refers to appropriate displacement of the flexible core wires 62.

As shown in FIGS. 6 to 8, there is depicted an alternate embodiment of the actuating device of this invention is indicated generally by reference numeral 100. In this embodiment, the actuating device 100 may include a support housing 102 mountable, as a unit, on any convenient portion of the bicycle, such as the bicycle housing stem, in a suitable manner. Although the embodiment to be described discloses use of a housing 102, such need not be employed. The housing 102, however, is generally defined by a casing 104 which has removably secured thereto a generally flat cover plate 106. Cover plate 106 is fastened to the casing 104 by conventional threaded members 108 which threadedly cooperate with respective threaded openings 110 formed in casing 104. Housing 102 may, of course, be fabricated from any type of suitable material, especially one which is adapted to withstand outdoor usage as well as occasional impact loads without fracturing. Casing 104 includes at least a top surface 112 and a bottom surface 114. The general longitudinal extent of the top surface 112 with respect to the longitudinal extent of the bottom surface 114 is such that it is generally oriented by about 90° for purposes hereinafter made apparent. Additionally, both the top and bottom surfaces 112 and 114 have pairs of respective portions 112a and 114a forming the top and bottom surfaces. A multiplicity of apertures 115 are formed in housing 102 such that a single aperture 115 is located within a respective one of the portions 112a and 114a. The aforenoted constructional arrangement facilitates in directing the otherwise unwieldy cables from the handlebar levers 56 to their respective brake devices 44 and 46. The connection means envisioned for use in the instant embodiment is also defined by the grommet member 76 depicted in FIG. 10.

Again referring to FIGS. 6 to 8, the actuating device 100 includes a generally vertically movable control member 116 which serves to operatively interconnect the front and rear handlebar cables to the forward and rearward braking devices 44 and 46, respectively, in a manner to be hereinafter set forth. Movable control member 116 may have any desired and suitable configuration, and in the embodiment illustrated in FIGS. 6 to 8 adopts that of a generally flat plate member 118 having a plurality of openings 120 formed therethrough. Openings 120 are arranged in generally oppositely situated pairs, which pairs are oriented by about 90° relative to each other. As more particularly pointed out in FIG. 7, the movable brake control member 116 is, whenever appropriately actuated, displaced in a generally vertical path for reasons to be more fully set forth below.

This embodiment of the present invention may include a pair of conventional type of first coupling or fastening members 122 and 122a which are securely fit in any manner within the openings 120. In the illustrated embodiment, the rear brake actuating cable 50 is not a continuous member but is separated into a rearward brake actuating cable 50' and rearward handlebar cable 50''. Fastening member 122 has secured thereto, in a known manner, the rear handlebar actuating cable 50''. Appropriately connected to the second fastening member 122a is the rear brake actuating cable 50'. By such an arrangement, it will be appreciated that, whenever the rear handlebar actuating cable 50'' is displaced in response to actuation of its handlebar lever 56, the brake control member 116, as well as the rear brake actuating cable 50' are correspondingly displaced. Since the braking pressure applied by the forward and rearward wheel braking devices 44 and 46 is a direct function of the displacement of the brake actuating cables 48 and 50' connected thereto, the braking pressure applied by the rearward braking device 46 is a direct function of the displacement of the movable control member 116.

A fastening member 124 (FIG. 7) similar in construction and operation to 122 and 122a is fitted within an opening 120 in plate 118. Fastening member 124 which is suitably fit within opening 120 directly connects the forward handlebar actuating cable 58 to the movable control member 116. By this form of connection, a given displacement of the forward handlebar actuating cable 58 will correspondingly result in a similar vertical displacement of the movable brake control member 116 from a rest position, such as indicated by the solid lines in FIG. 7, to an operative position, as indicated by the phantom lines therein.

With continued reference to FIGS. 6 and 7, biasing or dampening means 126 is provided which essentially comprises a retaining member 128 and spring 130. In the present embodiment, such member 128 takes the form of a generally cup-shaped washer, which has fixedly connected thereto, in any suitable manner, one end of the front brake actuating cable 48. An appropriate type of spring 130 is interposed between the cup-shaped retaining washer 128 and the top surface of the plate member 118. Additionally, the spring 130 is disposed about the front brake actuating cable 48. As will be noted, the front brake actuating cable 48 extends through one of the openings 120 to a height above the control member 116 which is defined by the spring 130. In this manner of arrangement, the spring 130 will serve to delay and shorten any displacement of front brake actuating cable 48 with respect to displacement of the rear brake actuating cable 50' in response to displacement of the movable control member 116. Accordingly, the rearward braking device 46 will not only be actuated prior to the forward braking device 44 but, in addition, the braking pressure applied by the former will be at a differential greater than that applied by the latter. Of course, the amount of dampening or delay provided by the spring 130 is a function of its spring rate. Consequently, a suitable spring should be chosen to suit particular situations wherein a certain differential in displacement and time delay might be desired. Moreover, although a spring 130 has been disclosed for use as a dampener, fluid dampening devices may be equally as successfully used in lieu thereof without departing from the scope of the present invention.

Having thus described the aforenoted constructional arrangement, it is believed that the operation of this embodiment of the instant invention is evident from the foregoing description. However, to supplement such description, it will be understood that whenever there is sequential, simultaneous, or even just singular action of either or both of the front and rear handlebar levers 56, the respective actuating cables 50'' and 58 are appropriately displaced. Since such cables 50'' and 58 are fixedly connected to the movable control member 116, displacement of either or both will correspondingly, therefore, result in displacement of the control member 116 such as in the manner indicated in FIG. 7. As should be understood throughout the specification, reference to displacement of cables 48, 50', 50'' and 58 refers to actual displacement of the core wire 62 formed in each of such cables.

As noted, inasmuch as the rear brake actuating cable 50' is fixedly connected to the movable control member 116, it will be displaced by a similar distance. Thusly, the rear wheel brake device 46 is immediately actuated. The actuation of the front brake device 44, however, is delayed until the movable brake control member 116 overcomes the bias of the spring 130 to the extent that it will exert a generally uplifting force on the front brake cable 48 to thereby displace the same. Accordingly, the forward braking device 44 will be actuated. As can be appreciated, since the front brake actuating cable 48 is actuated subsequent to the rear brake actuating cable 50' and is displaced by a proportionately less distance than that of the movable control member 116 and rearward brake actuating cable 50', the forward braking device 44 is applied last and also applies less braking pressure to the forward wheel 36.

With particular reference to FIG. 9 taken in conjunction with FIG. 11, there is illustrated another embodiment of the actuating device of this invention. Since this embodiment is in many respects similar to the foregoing, like parts corresponding to the previous embodiment have been designated by similar reference characters with the substitution of the prefix two for one. The support housing means 202 is formed by a generally C-shaped member 132 suitably mounted on the stem housing in appropriate fashion. Movable brake control member 216, instead of being suspended between top and bottom surfaces 134 and 136, is pivotally supported as at 138 to a generally vertical wall 140 of the housing 202. Moreover, the forward and rearward handlebar actuating cables 58 and 50'' are affixed to the member 132 by grommets 76 while core wires 62 thereof are rigidly connected to insert type fastening members 142 fit within the openings 220 formed in the plate 218.

The instant embodiment differs from the foregoing in that a biasing means is not interposed between the movable brake control member 216 and the front brake actuating cable 48, so as to delay and shorten displacement of the latter. Instead, the front brake actuating cable 48 is directly and fixedly connected to the movable brake control member 216. Towards this end, a fastening or grommet member 143 attains such connection. The rearward braking cable 50' is also directly connected to control member 216 by a grommet member 143 or the like. Accordingly, displacement of the movable brake control member 216 will result in immediate displacement of both the forward and rearward brake actuating cables 48 and 50', respectively. The present embodiment achieves the aforenoted application of differential pressures by situating the rear brake actuating cable 50' a further distance from pivot 138 for the movable brake control member 216 than the forward brake actuating cable 48 is situated. In such a manner, it can be appreciated that, upon pivotal movement of the movable control member 216, the rear brake actuating cable 50' will be displaced by a greater distance than the front brake actuating cable 48 as is clearly shown in FIG. 11. It follows, therefore, that the rearward braking device 46 will apply a greater pressure than the forward braking device 44, regardless of which handlebar actuating cable 50" and 58 is displaced in response to actuation of handlebar levers 56. It is believed that an understanding of the present embodiment is obvious from the foregoing description. It is realized, of course, that the differentials in pressures applied may be changed by correspondingly varying the differences in distance, the forward and rearward brake actuating cables 48 and 50' are spaced from the pivot 138.

Figure 12:
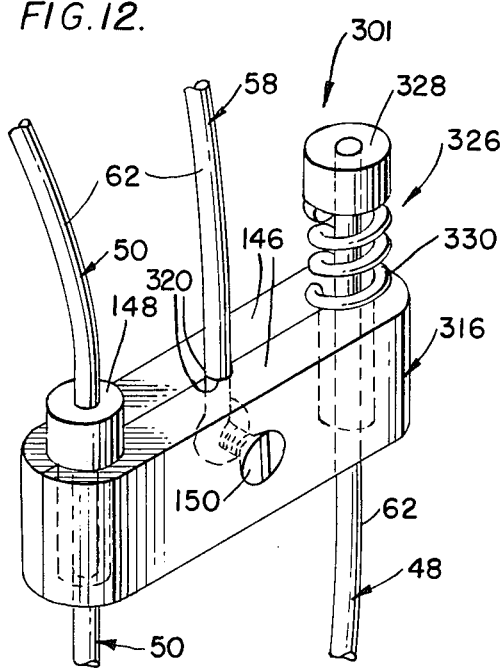
FIG. 12 is a perspective view of yet another embodiment of the actuating device of the present invention.
Figure 15:
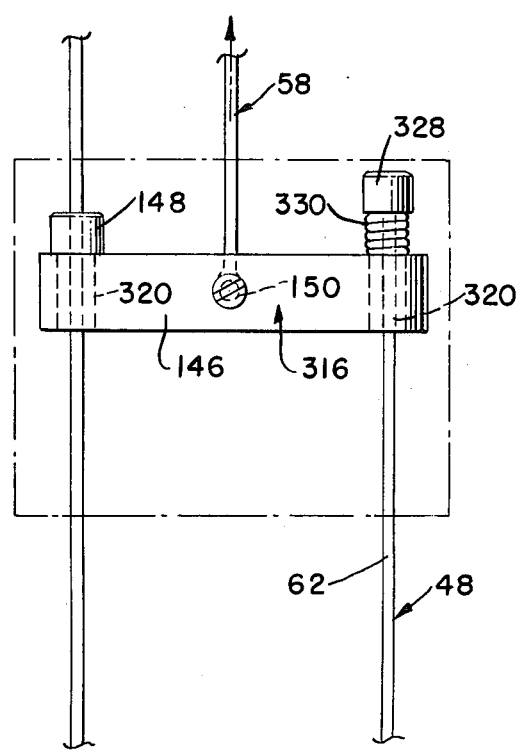

Specifically referring to FIGS. 12 and 15, there is disclosed a third alternate embodiment made in accordance with the principles of the present invention. Since this particular embodiment of the safety brake device is in many respects similar to the first alternate embodiment like parts thereof, throughout the several views will be indicated by like reference characters with, however, the substitution of the prefix three for one. The present embodiment of safety brake actuating device 300 differs from the preceding ones in that rear handlebar actuating cable 50" and rear brake actuating cable 50' are in fact one continuous cable 50.

Turning now to FIG. 12, this particular embodiment of the safety brake actuating device 300 includes movable control means 316. Such movable control means 316 may be comprised of two molded half sections 146 which are removably fastened together in a manner to be elaborated upon in the subsequent description of the instant embodiment. The material which may be used for the construction of such molded half sections 146 should possess impact and weather-resistant qualities so as to withstand the rigors of outdoor usage. It will be noted that in the embodiment presently being illustrated, no support housing is illustrated, since it is contemplated that the safety actuating device 300 be freely movable with respect to bicycle 30. Although a support housing has not been provided, the present invention contemplates that a housing may be suitably employed.

A generally circular stop member 148 is suitably fixedly connected to core wire 62 of rear brake actuating cable 50 so as to be conjointly movable therewith. Cable 50 extends through the elongated passage 320 in assembled sections 146 and is appropriately connected to rearward braking device 46. The stop member 148 can be fabricated from any suitable material. In its normal or inoperative position, stop member 148 is so positioned that it contacts or abuts the top surface of the movable control member 316, such as in the manner indicated in FIG. 12. It will be appreciated that the sheaths associated with the respective cables in this embodiment have not been shown or for that matter retaining devices for such sheaths. It will be understood, however, that the sheaths and retaining members can, of course, be suitably and conventionally handled in order to permit application of this embodiment.

A fastening member 150 which may be a well-known type of screw or the like, releasably interconnects sections 146. Fastening member 150 serves to fixedly and directly connect the front handlebar actuating cable 58 to the movable brake control member 316. By this form of connections, a given displacement of front handlebar actuating cable 58 will correspondingly, therefore, result in a similar vertical displacement of movable brake control member 316.

A dampening means 326 essentially includes retaining member 328 and a coil spring 330. In this embodiment, the retaining member 328 has a generally circular configuration and is appropriately attached to the front brake actuating cable 48. Cable 48 passes through corresponding opening 320 in movable control member 316. Resilient means or spring 330 is interposed between retaining member 328 and the top surface of movable brake control member 316.

Figure 13:
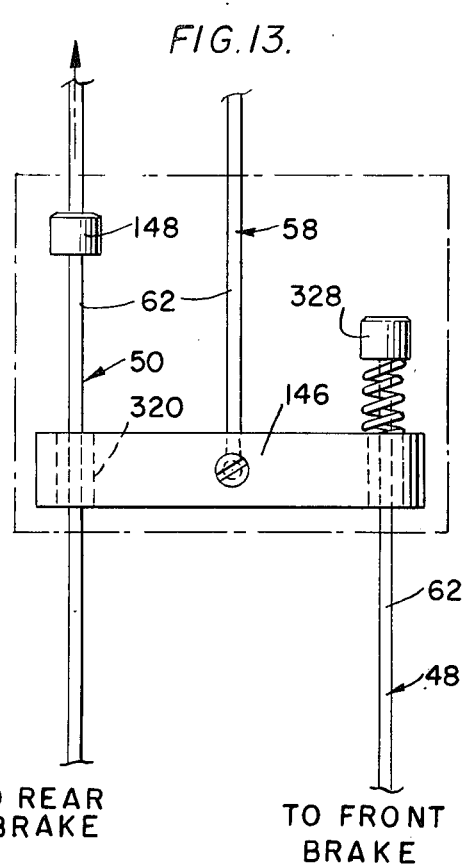
FIG. 13 is a side elevational view of the actuating device depicted in FIG. 12 illustrating a rear brake actuating cable being independently actuated with respect to a front brake actuating cable.
Figure 14:
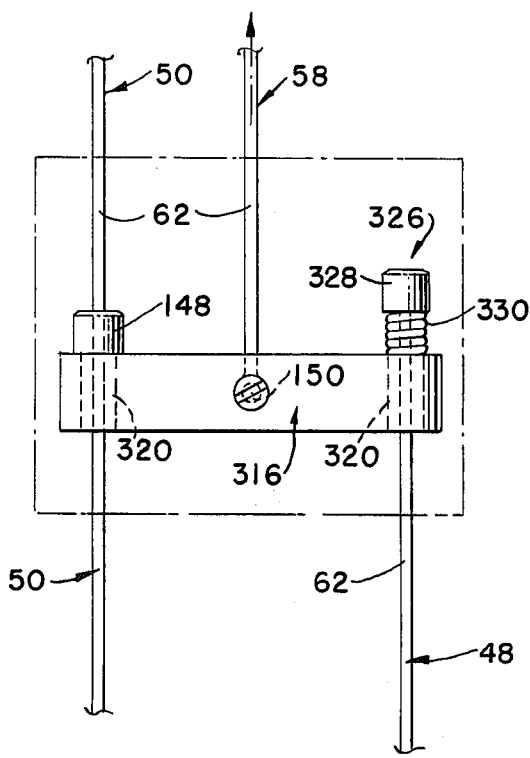
FIGS. 14 and 15 are side elevational views similar to FIG. 13 illustrating the positional sequences of the components forming the safety brake actuating device in response to displacement of the front handlebar actuating cable.

An understanding of the operation of the above constructional arrangement of the above components is believed evident from the foregoing description, taken in conjunction with the description of the previous embodiments, however, to supplement such understanding reference is made to FIGS. 13 to 15, wherein there is depicted a sequence of operating positions for the components.

If the rear brake actuating cable 50 is appropriately displaced in the usual fashion by actuation of the handlebar control levers 56 associated therewith, the circular stop member 148 rises from movable control member 316 and correspondingly, of course, the core wire 62 of rear brake actuating cable 50 freely passes through passage 320 such as shown in FIG. 13. Accordingly, the rearward braking device 46 will be appropriately actuated independently of the forward braking device 44.

To operate the forward braking device 44, front handlebar actuating cable 58 is displaced upwardly in response to actuation of the control lever connected therewith. As a result, the movable control member 316 is correspondingly moved upwardly. As noted in FIG. 14, the stop member 148 which contacts movable control member 316 enables the rear brake actuating cable 50 to be similarly upwardly moved. In this process, the rear brake device 46 is applying pressure to the rearward wheel 38 by reason of the rear brake actuating cable 50 being displaced. The magnitude of displacement of rear brake actuating cable 50 and movable control member 316 are substantially identical. Conjointly with the foregoing movement, spring 330 is compressed by the noted upward movement of movable brake control member 316. However, during the actual compression of spring 330 forward brake actuating cable 48 is not displaced. Consequently, the forward braking device 44 will, at least initially, not apply a braking pressure to the front wheel 36. Displacement of front brake actuating cable 48, however, will occur upon further upward movement of movable control member 316 and front handlebar actuating cable 58, much as in the manner indicated in FIG. 15. Accordingly, rearward braking device 46 will be applied but at a lesser braking pressure since, a indicated earlier, the braking pressure of the brake devices is a function of displacement of the brake actuating cables. Of course, this resultant delay of the actuation of the forward braking device 44 after the actuation of rearward braking device 46 will enable the rearward braking device 46 to be applied earlier and since cable 48 is displaced less than cable 50 with greater braking pressure than forward braking device 44. Accordingly, such operation provides for safety in the brake actuation of two-wheeled vehicles having front and rear brakes.

In connection with FIGS. 16-19, there is illustrated still another embodiment of the present invention. Inasmuch as this particular embodiment of the safety brake device is similar to the first alternate embodiment, like parts thereof throughout the several views will be indicated by like reference characters with, however, the substitution of the prefix four for one.

As shown in FIG. 16, taken in connection with FIGS. 17-19, safety brake actuating device 400 includes housing 402 which encloses the movable control member 416. Suitable openings 415 in the housing 402 permit passage of core wires 62 of the cables 48, 50 and 58 therethrough. The housing 402 may include a casing 404 with a removable cover plate 406, indicated in dotted lines, which is suitably removably secured thereto. Housing 402 should be large enough to permit generally pivotal movement of control member 416, in a manner to be described presently. Housing 402 may be connected by suitable means to the bicycle 30 in any conventional fashion. It should be emphasized that housing 402 need not be secured to the bicycle 30. The movable control member 416 is constructed in a manner such that fastening member 152 which connects molded half sections 154 is positioned on center or generally between the core wires 62 of forward and rearward braking cables 48 and 50, respectively. The half sections 154 when joined together define a plurality of openings 420 which accommodate core wires 62 of cables 48, 50 and 58. The middle opening 420, however, in this embodiment is somewhat elongated for purposes made clear. A fastening member 156 connects forward brake actuating cable 48 to motion control member 416.

A stop member 158 is fixedly connected to rear brake actuating cable 50. Such cable 50 is adapted to freely pass through opening 420 formed in movable control member 416 and apertures 415 in housing 402. By this arrangement, stop member functions in an identical manner as the previously described stop member 148 of the preceding embodiment.

In this embodiment, a dampening means 426 is comprised of a spring 160 which has a pair of legs, one of which is situated generally parallel to the top surface of housing 402 and is thereby constrained from further movement. The opposite leg of spring 160 may have a tang portion 162 or the like which contacts one end of the movable control member 416 such as clearly indicated in FIGS. 16 and 17. This latter leg of spring 160 serves to downwardly and yieldingly bias the right hand portion of brake control member 416 for purposes to be described in the succeeding description of the present embodiment. The convoluted portion of the spring 160 may be mounted in a suitable manner (not shown) in casing 404.

Referring to FIG. 17, the operation of the rearward braking device is believed made obvious from the foregoing descriptions. Turning specifically to FIG. 18, it will not be noted that whenever the front brake handlebar actuating cable 58 is displaced the movable control member 416 is pivoted from the normal or rest position shown in FIG. 17 so that its left side is elevated with respect to the opposite right side. As therein depicted, the rear brake actuating cable 50 which is movable with movable control member 416 by virtue of stop member 158, has been displaced a greater distance than the front brake actuating cable 48. This is by reason of the fact that the spring 160 downwardly yielding urges the right side portion of the movable control member 416. Continued displacement of forward braking handlebar actuating cable 58, will, however, enable the right side portion of movable control member 416 to pivot upwardly with respect to the left side by overcoming the bias force provided by the spring 160. Such latter pivoting will continue until, as indicated in FIG. 19, both legs of spring 160 are substantially parallel, and the front and rear brake actuating cables 48 and 50 respectively have been displaced by about the same distance. Hence, in this situation the brake devices 44 and 46 will apply approximately the same braking pressure.

As is believed evident from the foregoing, this embodiment enables the rearward braking device 46 to be initially applied with greater braking force than the forward braking device 44 by reason of the fact that the rearward braking actuating cable 50 is initially displaced by a greater distance than the front brake actuating cable 48.

With respect to FIGS. 20 to 23 there is illustrated yet another embodiment of the present invention. This latter embodiment is similar in many respects to the first alternate embodiment and, therefore, like reference characters throughout the several views will be indicated by like reference numerals with, however, the substitution of a prefix (5) for (1).

Figure 20:
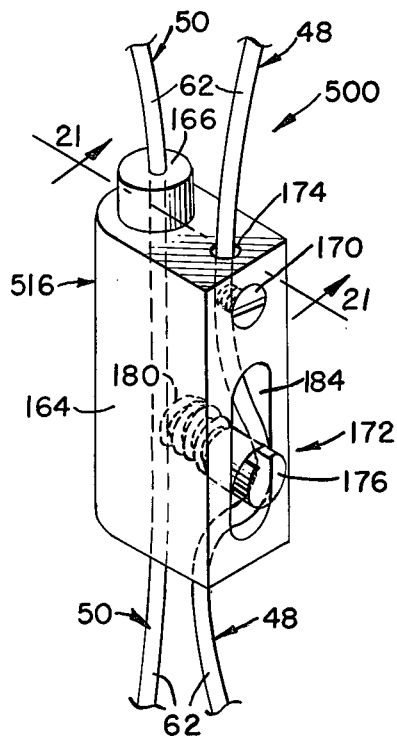
FIG. 20 is a perspective view of a further embodiment of an actuating device made in accordance with the principles of the present invention.
Figure 21:
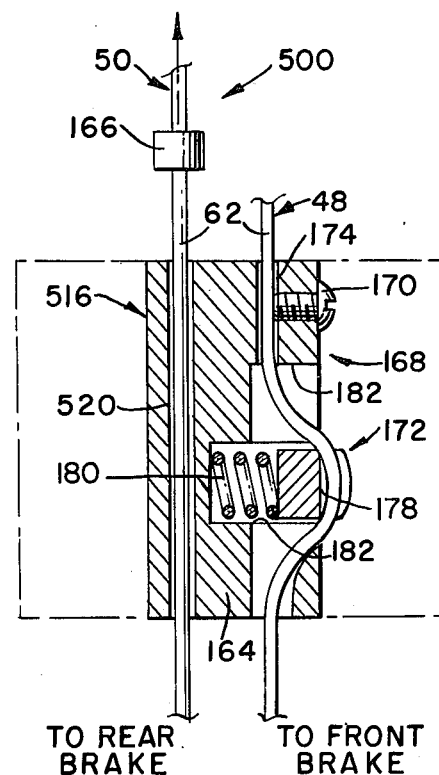
FIG. 21 is a cross-sectional view taken substantially along section line 21—21 in FIG. 20 looking in the direction of the arrows and illustrating the rear brake actuating cable being independently actuated with respect to the front brake actuating cable.

As shown in FIG. 20, the movable control member 516 of safety brake actuating device 500 may be comprised by a unitary body member 164. A circular stop member 166 is fixedly secured to rear actuating cable 50. The cable 50 freely passes through opening 540 in movable control member 516, while stop member 166 is ordinarily adapted to abut the top of such movable control member. As is believed apparent, whenever viewing FIG. 21, the rearward brake actuating cable 50 and stop member 166 operate in the same manner as previously described in connection with cable 50 and stop member 158.

Now with reference to coupling means 168 of the instant embodiment, it will be noted that such acts only upon the front brake actuating cable 48, which in this particular instance serves to directly interconnect the front handlebar lever 56 to the forward braking device 44. Such coupling means 168 basically includes threaded member 170, and biasing or tension relief means 172. Threaded fastening member 170 may be a known type of screw or the like which fixedly secures the front brake actuating cable 48 to the movable control member 516. Such front brake actuating cable 48 extends through another elongated passage 174 and cooperates with tension relief means 172. In this embodiment, relief means 172 may include a plug or retaining member 176 which has formed at the forward end thereof a recess 178. Recess 178 functions to accommodate therein the front brake actuating cable 48. A coil take-up spring 180 is provided which has one end thereof received within a recess 182 formed in movable control member 516 and its opposite end engages the plug member 176 for normally urging the latter outwardly. As a result thereof, the front brake actuating cable 48 in recess 178 may be forced outwardly with respect to a side opening 184 which is also formed in movable control member 516. In this manner, the forward brake actuating cable 48 will be relatively slack with respect to the rear brake actuating cable 50. Accordingly, before forward brake device 44 can be actuated, the slack in cable 48 will have to be removed.

Figure 22:
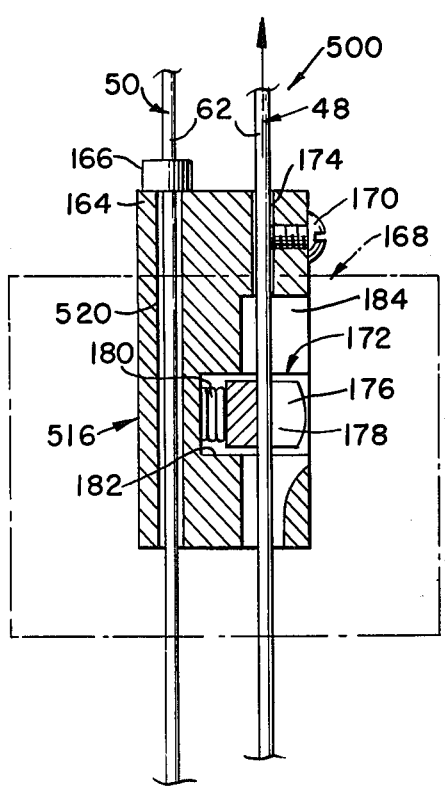
FIGS. 22 and 23 are views similar to FIG. 21 illustrating the positional sequences of the components forming the actuating device in response to displacement of the front brake actuating cable.
Figure 23:
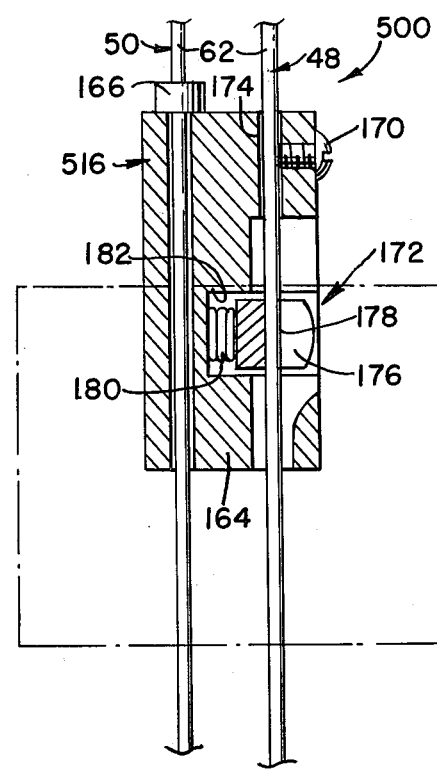

To perhaps best understand the operational sequence of steps in the aforenoted arrangement of components, reference is maade to FIGS. 22 and 23. As therein depicted, whenever the front brake actuating cable 48 is initially upwardly displaced, such displacement will result in a corresponding upward movement of control member 516. Conjointly with the foregoing, the rear brake actuating cable 50 is simultaneously and correspondingly displaced by reason of the abutting relationship of the stop member 166 with the single body 164. However, the front brake actuating device 44 will not be actuated until the slack in cable 48 caused by tension relief means 172, is eliminated. As a consequence thereof, the rear brake device 46 is initially applied prior to the front brake device 44. Further upward movement of front brake actuating cable 48, serves to compress the take-up spring 180. Accordingly, the plug member 176 is forced inwardly through side opening 184 and into recess 182. As a result thereof, and as best shown in FIG. 22, the slack in cable 48 will be eliminated and it will be in a virtually straight position, whereat it achieves equilibrium with spring 180. It should be pointed out that since the front brake actuating cable 48 is fixed by fastening member 170, the spring 180 can only be compressed if the entire movable control member 516 is displaced.

As best illustrated in FIG. 23, the continued upward displacement of front brake actuating cable 48 will similarly lift movable control member 516 and rear brake actuating cable 50. Since front brake cable 48 is now straight and directly connected to the front brake device 44 it will, in suitable fashion, actuate the front brake device. Of course, it will be understood that the resultant displacement of the front brake actuating cable 48 is proportionately less than that of rear brake actuating cable 50 by virtue of the fact that the cable 48 must be displaced a sufficient distance to first compress the take-up spring 180. Accordingly, the front brake device 44 applies less braking pressure during the foregoing operation. Moreover, as is believed evident from the previous description, actuation of front brake device 44 is applied subsequent to rear brake device 46. The duration of delay, of course, being determined by the amount of time necessary to compress spring 180 by the desired amount.

Although the previous description of the present invention has centered about the application thereof to two-wheeled vehicles, it is certainly within the scope of the present invention that such actuation devices may be utilized in situations where there are more than two brakes required. Furthermore, even though the actuation devices have been employed in conjunction with brakes whose braking pressure is a direct function of the displacement of the cables connected thereto, it is within the spirit and scope of the invention that other types of actuatable devices may be appropriately substituted for such brake devices if relative displacements between them will effect a differential output therefrom.

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claied is:

1. A safety actuating brake device for controlling the application of braking action to a vehicle having at least two wheels, one wheel being a forward wheel, the other wheel being a rearward wheel, each wheel having associated therewith means for braking and unbraking the rotation thereof in response to displacement inputs directed thereto and forward and rearward associated operator control means which comprises:
  a. movable control means positioned intermediate the forward and rearward braking means and the associated operator control means and being displaceable for at least initiating braking action on the rear wheel in response to at least one displacement input;
  b. means operatively communicating said movable control means with said rearward braking means;
  c. means operatively communicating said rearward operator control means with said movable control means and with said associated rearward braking means;
  d. means operatively communicating said movable control means with said forward braking means;
  e. means operatively communicating said forward operator control means with said movable control means, wherein the operative communication between the forward and rearward operator control means to said movable control means and the operative communication between said movable control means to said respective forward and rearward vehicle wheels being such that actuation of said associated rearward operator control means produces at least a corresponding displacement and braking action of said rearward wheel, and actuation of said associated forward operator control means produces a displacement of said movable control means which enables at least an initial displacement of said rearward brake means which at least initially exceeds the displacement and braking action applied to said forward wheel thereby assuring at least initial rearward braking action on said vehicle when operational control movements are applied to either said rearward or forward operator controls.

2. The device according to claim 1 wherein said movable control means is an elongated member; said means operatively communicating said movable control means with said rearward braking means includes a first control cable; said means operatively communicating said rearward operator control means with said movable control means and with said associated rearward braking means includes first fastening means connected to said first cable; said means operatively communicating said movable control means with said forward braking means including a second flexible cable connected to said elongated member and said forward braking means; and said means operatively communicating said forward operator control means with said movable control means including a third flexible cable connected from said forward operator control means to a centrally offset portion of said elongated member such that said third cable is spaced farther from said first cable than said second cable whereby actuation of said third cable provides pivotal displacement of said movable control means and corresponding braking action to said rearward brake means which at least initially exceeds the braking action applied to said forward wheel.

3. The device according to claim 2 wherein said elongated member includes a plurality of generally arcuate cutouts, and said first fastening means is removably received within one of said cutouts, said cutouts being shaped to permit relative movement between said fastening means and said elongated member; said means operatively communicating said movable control means with said forward braking means including a second fastening means which is connected to said second cable and is received within a second one of said cutouts; and said means operatively communicating said forward operator control means to said movable control means includes a third fastening means which is fixedly connected to said third cable and is removably received within a third of said cutouts in said elongated member.

4. The device according to claim 3 in which each of said cutouts respectively communicates with openings in said elongated member, said openings enable relative pivotal movement of said elongated member with respect to said first, second and third cables for avoiding pinching of said first, second and third cables during relative pivotal movement of said elongated member with respect to said first, second and third fastening means.

5. The device according to claim 3 in which said fastening means include a threaded bolt having an aperture therethrough which enables slidable accommodation of one of said cables, and a nut which threadedly cooperates with said bolt for detachably affixing said nut and bolt to one of said cables.

6. The device according to claim 1 wherein said means operatively communicating said movable control means with said rearward braking means includes a first cable operatively connected to said control means and to said rearward braking means; said means operatively communicating said rearward operator control means with said movable control means and with said associated rearward braking means includes first and second fastening members directly connected to and movable with said movable control means, and a second cable attached to and between said second fastening member and said rearward operating control means, said first fastening member also being connected to said first cable; said means operatively communicating said control means with said forward braking means including a third cable, and bias means operatively connecting said movable control means to said third cable for providing a bias for delaying displacement of said third cable, said third cable also being connected to said forward braking means; and said means operatively communicating said forward operator control means with said movable control means includes a fourth cable, and a third fastening member directly connected to said movable control means and to said fourth cable, said fourth cable being connected to said forward operator control means such that whenever either of said second and fourth cables are displaced in response to actuation thereof by associated ones of said forward and rearward operator control means, said movable control means and said first cable are correspondingly displaced and said third cable is displaced whenever said movable control means overcomes the bias of said bias means, said displacement of said third cable being subsequent to the initial displacement of said first cable and by a proportionately less distance than the displacement of said first cable.

7. The device according to claim 1 which further includes support means for pivotally supporting said movable control means about a pivot axis; said means operatively communicating said movable control means with said rearward braking means including a first cable operatively interconnecting said movable control means to said rearward brake means; said means operatively communicating said rearward operator control means with said movable control means and with said associated rearward braking means comprises first and second fastening members directly connected to and conjointly movable with said movable control means, and a second cable attached to said second fastening member and said rearward operating control means, said first fastening member also being connected to said first cable and being spaced from the pivot axis by a first distance; said means operatively communicating said forward operator control means with said movable control means including a third cable and third fastening member which is connected to and conjointly movable with said movable control means, said third cable being connected to said forward operator control means; said means operatively communiating said control means with said forward braking means including a fourth cable and a fourth fastening member which is directly connected to and movable with said movable control means and said fourth cable, said fourth cable being connected to said forward brake means, said fourth fastening member being spaced a second distance from the pivot axis which is less than said first distance such that whenever said movable control means is pivoted in response to displacement of said second and third cables, said fourth cable is displaced by a distance less than the displacement of said first cable.

8. The device according to claim 1 wherein said movable control means is a generally elongated member; said means operatively communicating said movable control means with said rearward braking means includes a first control cable being connected to said rearward operator control means; said means operatively communicating said rearward operator control means with said control means and with said associated rearward braking means includes a first fastening member connected to said first cable and movable therewith; said means operatively communicating said movable control means with said forward braking means including a second cable, and bias means operatively connecting said movable control means to said second cable for retarding displacement of said second cable being connected to said forward braking means; and said means operatively communicating said forward operator control means with said control means having a third cable, and a third fastening member which directly connects said elongated member to said third cable, said third cable being connected to said forward operator control means such that displacement of said third cable results in corresponding displacement of said elongated member and said first cable and said bias means displacing said second cable after initial displacement of said first cable and by less of a distance for delaying actuation of said forward brake means with respect to said rearward brake means, said first cable and said first fastening member being movable independent of said elongated member whenever said first cable is independently displaced.

9. The device according to claim 1 which further comprises support means for said movable control means; said means operatively communicating said movable control means with said rearward braking means includes a first cable being connected between said rearward operator control means and brake means; said means operatively communicating said rearward operator control means with said movable control means and with said associated rearward braking means including a first fastening member connected to and movable with said first cable; said means operatively communicating said forward operator control means to said movable control means includes a second cable connected to said forward operator control means and operatively to said movable control means and a second fastening member connected to said movable control means and said second cable to be conjointly movable therewith; said means operatively communicating said movable control means with said forward braking means including a third cable connected to said forward braking means, a third fastening member connected to said third cable and said movable control means, and biasing means, operatively connected between said support means and at least a portion of said movable control means adjacent said third fastening member, such that whenever said second cable displaces said movable control means, said movable control means pivots to displace the said first cable by a distance which initially exceeds the displacement of said third cable, and continued displacement of said second cable results in further pivotal movement of said movable control means such that a bias force of said bias means is overcome to thereby enable said third cable to be displaced sequentially after displacement of said first cable.

10. The device according to claim 1 wherein said means operatively communicating said movable control means with said rearward braking means includes a first cable being connected between said rearward operator control and brake means; said means operatively communicating said rearward operator control means with said movable control means and with said associated rearward braking means includes a first fastening member connected to and movable with said first cable; said means operatively communicating said forward operator control means with said movable control means being a second fastening member; and said means operatively communicating said movable control means with said forward braking means includes a second cable which interconnects said forward braking means to said forward forward operator control means, said second fastening member fixedly connecting said second cable to said movable control means such that said movable control means is conjointly movable with said second cable, and biased tension relief means for contacting and outwardly biasing said second cable to cause slack in said second cable, and operatively connecting said movable control means to said rearward brake means for inhibiting movement of said rearward brake means, said second cable actuating said forward brake means whenever displaced by a distance sufficient to overcome bias of said tension relief means and eliminate the slack of said second cable, said displacement of said second cable displacing said movable control means and said first cable for actuating said rearward brake means, said displacement of said first cable being prior to a greater distance than said second cable.

11. An actuating mechanism for transmitting displacement output signals to at least a first and second displacement output means in accordance with a predetermined sequence and in response to actuation of first and second operator control means operatively associated with the first and second output means which comprises movable control means defining at least one opening therethrough, said control means being displaceable in response to actuation of at least the first operator control means, first and second coupling means operatively connected to said movable control means, said first coupling means being operatively connected to the first output means and the first operator control means, and communicating with said opening in said movable control means such that displacement of at least the first operator control means provides a corresponding displacement of the first output means, said second coupling means connecting the second operator control means to said movable control means and operatively connecting the second output means to said movable control means in a manner such that whenever at least the second operator control means is actuably displaced the movable control means is displaced and the first output means is displaced by a distance which at least initially exceeds the distance for the second output means.

12. The actuating mechanism according to claim 11 further comprising support means for said movable control means; and said second coupling means comprises first fastening means which interconnects the second operator control means to said movable control means, second fastening means interconnecting the second output means to said movable control means, and bias means operatively connected between said support means and at least a portion of said movable control means adjacent said second fastening means such that whenever the second operator control means is displaced, said movable control means pivots to displace the first output means by a distance which initially exceeds the displacement of the second output means, and continued displacement of the second operator control means results in further pivotal movement of said movable control means such that the bias force of said bias means is ultimately overcome thereby enabling the second output means to be displaced sequentially after displacement of the first output means.

13. The actuating mechanism according to claim 11 in which said first operator control and output means are integrally connected, said first coupling means includes a fastening member fixedly connected to the first output means and normally abutting a surface of said movable control means above said opening, said fastening member being movable in unison with said movable control means whenever the second operator control means is displaced, and is movable freely of said movable control means in response to actuation of the first operator control means to correspondingly displace the first output means; and said second coupling means includes a second fastening member which fixedly connects the second operator control means to said movable control means, and bias means operatively connecting said movable control means to the second output means such that a given displacement of said movable control means in response to a corresponding displacement of the second operator control means results in a proportionately less displacement of the second output means relative to said movable control means and said firts output means.

14. The actuating mechanism according to claim 11 in which said first coupling means includes a fastening member fixedly connected to the first output means, said fastening member being movable in unison with said movable control means whenever the second operator control means is displaced, and is conjointly movable with said movable control means in response to actuation of the first operator control means to correspondingly displace the first output means, said second coupling means includes a second fastening member which fixedly connects the second operator control means to said movable control means, and biasing means operatively connecting said movable control means to the second output means such that a given displacement of said movable control means in response to a corresponding displacement of the second operator control means results in a proportionately less displacement of the second output means with respect to the first output means.

15. The actuating mechanism as set forth in claim 11 in which the second operator control means includes a flexible cable connected to the second output means and said second coupling means includes a fastening member which fixedly connects said cable to said movable control means, and biased tension relief means which connects said cable to said movable control means for contacting and outwardly biasing said cable to cause slack in said cable and for inhibiting movement of said cable, such that whenever said cable means is displaced by a distance sufficient to overcome the bias of said tension relief means, the first output means is displaced prior to and by a greater distance than the displacement of said cable.

16. The actuating mechanism as set forth in claim 11 which further comprises a support means, said movable control means being pivotally connected to said support means for pivotal movement about a pivotal axis with respect thereto, said second coupling means connecting the second output means to said movable control means at a further distance from the pivotal axis than said first coupling means connects the first output means to said movable control means.

17. An actuating mechanism for controlling the application of braking action to a vehicle having at least two wheels, one wheel being mounted to the forward end of the vehicle, the other wheel being mounted to the rearward end of the vehicle, each wheel having associated therewith a brake means displaceable from an unbraking to a braking position and an associated operator control means which comprises:
  a. a control means movable relative to fixed portions of the vehicle;
  b. means connecting each operator control means to said movable control means in a manner such that said movable control means is displaceable in response to actuation of at least one or another of said operator control means to produce displacement of the brake means associated with the rear wheel in a manner which at least initially exceeds the displacement of the rear brake means to thereby produce rear braking of the vehicle prior to front braking; and
  c. means connecting said movable control means to said rear brake means and to said front brake means in a manner such that actuation of at least one of said operator control means produces displacement of the brake means associated with the rear wheel in a manner which at least initially exceeds the displacement of the front brake means to thereby produce rear braking of the vehicle prior to front braking.

18. An actuating mechanism for controlling the application of braking action to a vehicle having at least two wheels, one wheel mounted to the forward end of the vehicle, the other wheel mounted to the rearward end of the vehicle, each wheel having associated therewith a brake means displaceable from an unbraked to a braked position and associated forward and rearward operator control means which comprises:
  a. movable control means displaceable with respect to fixed positions of the vehicle in response to actuation of at least the front operator control means; and
  b. first and second coupling means operatively connecting said movable control means to said brake means, said first coupling means connecting the movable control means to said forward and rearward operator control means, means connecting said movable control means to said forward and rearward brake means such that displacement of the operator control means associated with the front brake means results in displacement of the rear brake device, said second coupling means connecting the front operator control means to said movable control means and operatively connecting the front brake device to said movable control means in a manner such that whenever at least the front operator control means is displaced, the rear brake means is displaced by a distance which at least initially exceeds the distance for the front brake device.

19. An actuating mechanism for transmitting displacement output signals to at least a first and second displacement output means in accordance with a predetermined sequence and in response to actuation of first and second operator control means operatively associated with the first and second output means which comprises movable control means defining at least one opening therethrough, said control means being displaceable in response to actuation of at least the first operator control means, first and second coupling means operatively connected to said movable control means, said first coupling means being operatively connected to the first output means and the first operator control means and communicating with said opening in said movable control means such that displacement of at least the first operator control means provides a corresponding displacement of the first output means, said second coupling means connecting the second operator control means to said movable control means and operatively connecting the second output means to said movable control means in a manner such that whenever at least the second operator control means is actuably displaced, the first output means is displaced by a distance which at least initially exceeds the distance for the second output means, said movable control means is an elongated member having generally arcuate cutouts, said first coupling means includes a first control cable, and a first fastening member which operatively communiates said first operator control means with said elongated member and with said associated first output means, said second coupling including a second flexible cable connected to said elongated member and said first output means, and a third flexible cable connected from said second operator control means to a centrally offset portion of said elongated member such that said third cable is spaced farther from said first cable than said second cable whereby actuation of said third cable provides pivotal displacement of said elongated member and corresponding braking action to said first output means which at least initially exceeds the braking action applied to said forward wheel.

* * * * *

UNITED STATES PATENT AND TRADEMARK OFFICE
CERTIFICATE OF CORRECTION

PATENT NO. : 4057127
DATED : November 8, 1977
INVENTOR(S) : Cooper Coolidge Woodring It is certified that error appears in the above-identified patent and that said Letters Patent are hereby corrected as shown below:

In the Abstract, last line, "of" should be --or--.

Col. 8, line 2, --46-- should appear after "device".

Col. 14, last line, "maade" should be --made--.

Col. 15, line 64, "claied" should be --claimed--.

Col. 18, line 41, after "cable" insert --, said second cable--.

Col. 20, line 54, "firts" should be --first--.

Signed and Sealed this

Fourteenth Day of March 1978

[SEAL]

Attest:

RUTH C. MASON
Attesting Officer

LUTRELLE F. PARKER
Acting Commissioner of Patents and Trademarks